United States Patent
Fridley

(10) Patent No.: US 7,402,034 B2
(45) Date of Patent: Jul. 22, 2008

(54) CENTER HEATED DIE PLATE FOR UNDERWATER PELLETIZER

(75) Inventor: Michael A. Fridley, Eagle Rock, VA (US)

(73) Assignee: Gala Industries, Inc., Eagle Rock, VA (US)

( * ) Notice: Subject to any disclaimer, the term of this patent is extended or adjusted under 35 U.S.C. 154(b) by 195 days.

(21) Appl. No.: 11/041,865

(22) Filed: Jan. 25, 2005

(65) Prior Publication Data

US 2006/0165834 A1 Jul. 27, 2006

(51) Int. Cl.
*B29B 9/06* (2006.01)
(52) U.S. Cl. .................. 425/378.1; 425/67; 425/313; 425/463; 425/464
(58) Field of Classification Search .............. 425/311, 425/313, 463, 464, 378.1, 67
See application file for complete search history.

(56) References Cited

U.S. PATENT DOCUMENTS

| | | |
|---|---|---|
| 3,521,325 A | 7/1970 | Schippers |
| 4,071,307 A | 1/1978 | Porro |
| 4,123,207 A | 10/1978 | Dudley |
| 4,621,996 A | 11/1986 | Hundley, III |
| 4,728,276 A | 3/1988 | Pauley et al. |
| 5,403,176 A | 4/1995 | Bruckmann et al. |
| 5,624,688 A | 4/1997 | Adams et al. |
| 6,474,969 B1 * | 11/2002 | Ready et al. ............ 425/67 |

FOREIGN PATENT DOCUMENTS

DE 196 09 065 * 1/1997

* cited by examiner

*Primary Examiner*—Tim Heitbrink
*Assistant Examiner*—Marissa W. Chaet
(74) *Attorney, Agent, or Firm*—Jacobson Holman PLLC

(57) ABSTRACT

A center heated die plate for an underwater pelletizer radiates heat outwardly to the extrusion orifices and die faces of the die plate thereby maintaining the die plate and extrusion orifices at an elevated temperature to obtain optimum flow of molten polymer through the extrusion orifices. In one embodiment, a centrally located heating plate is mounted in a recess on the upstream face of the die plate inwardly of the nose cone. In a second embodiment, a cylindrical heating coil is placed in a hollow central core of the die plate between the nose cone on the upstream side and an insulation plug or plate on the downstream side. Heating leads extend through a single radial hole in the die plate to provide power to the center heating element.

21 Claims, 3 Drawing Sheets

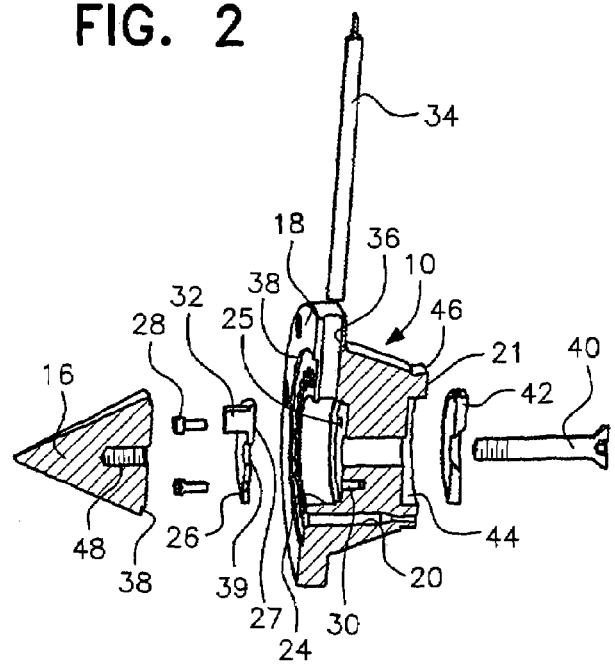

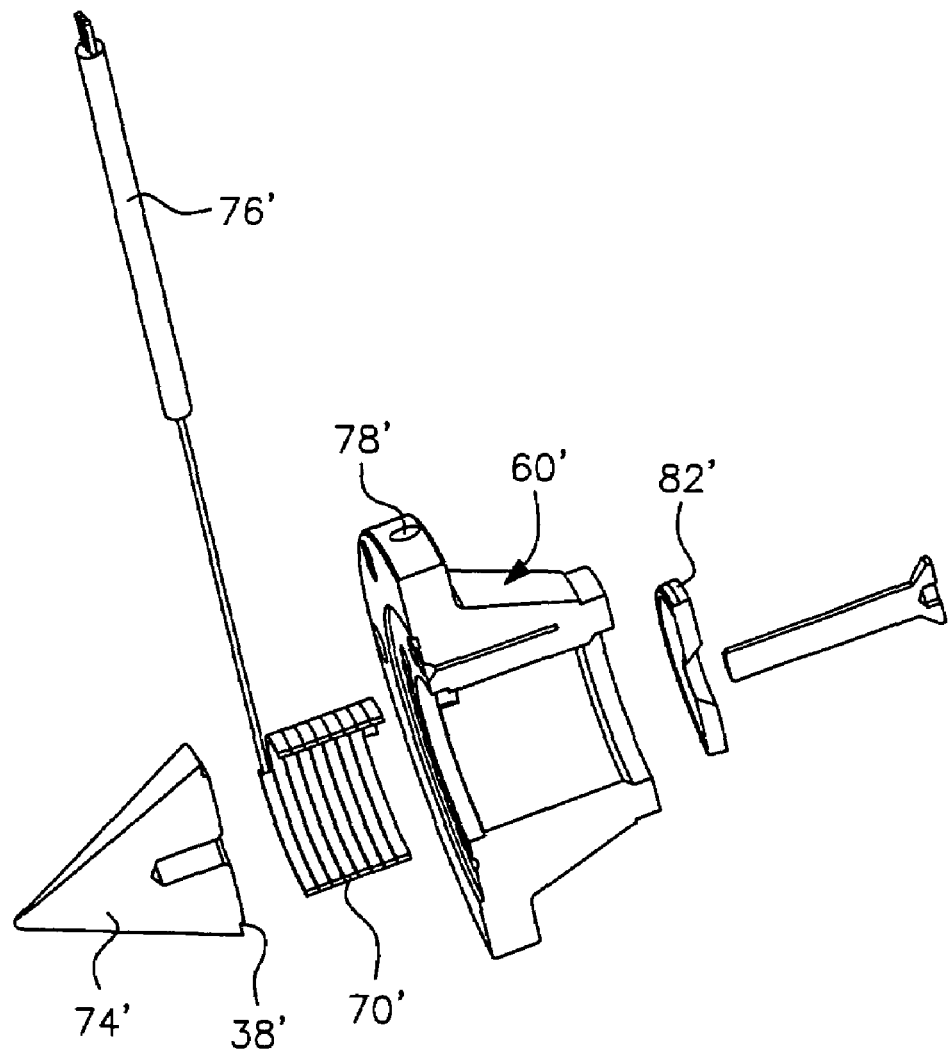

CENTER HEATED DIE PLATE FOR UNDERWATER PELLETIZER

BACKGROUND OF THE INVENTION

1. Field of the Invention

The present invention generally relates to heated die plates for underwater pelletizers and, more specifically, to center heated die plates for underwater pelletizers.

2. Description of the Related Art

Underwater pelletizers are well known and include a die plate having a plurality of extrusion orifices extending from an upstream side of the die plate to a downstream side for extruding strands of molten polymer or other extrudable materials. The extrusion orifices are arranged in one or more circular patterns concentrically of and in radially spaced relation to the center of the die plate and in spaced relation to each other. The extruded strands of polymer or other material are cut into pellets by rotating cutter blades in a water box. The blades cut the strands into pellets which have been cooled and solidified by the water in the water box. A slurry of pellets and water is discharged from the water box for subsequent removal of moisture from the exterior surface of the pellets.

It is desirable to maintain the die plate and orifices at an elevated temperature for optimum extrusion of the molten polymer through the extrusion orifices. Various efforts have been made to heat the die plate including the use of passageways in the die plate through which a heating fluid is circulated. Also, radial cavities have been formed in the periphery of die plates into which electric cartridge heaters are inserted from the external periphery of the die plate. Such known structures are typically illustrated in the following U.S. patents owned by the assignee of this application and include disclosures of heated die plates: U.S. Pat. Nos. 4,123,207; 4,621,996; 4,728,276; 5,403,176; and 5,624,688.

As illustrated in the above patents, heated die plates with concentric circular patterns of extrusion orifices are generally well known as well as passageways for heated fluid and cavities or pockets for receiving cartridge heaters. Such die plates require that portions of the die plates through which extrusion orifices would normally extend be occupied by the passageways for heating fluid or cavities for cartridge heaters. The passageways or cavities thus reduce the number of extrusion orifices that can be incorporated into the die plate since the passageways carrying the heating fluid or the cavities or pockets receiving the cartridge heaters require that the extrusion orifices be omitted from a portion of the area of the die plate. Also, the heated fluid passageways and heat cartridge cavities tend to concentrate heat radiation in areas closely adjacent to the passageways or cavities.

SUMMARY OF THE INVENTION

The center heated die plates of the present invention are installed in a conventional manner between the extruder and the water box of an underwater pelletizer. The upstream side of the die plate receives molten polymer from the extruder with the molten polymer being extruded through a plurality of orifices extending from the upstream side to the downstream side of the die plate to form extruded strands of polymer. The extruded polymer strands are cooled by water passing through the water box and are cut into pellets by rotating cutter blades associated with the downstream side of the die plate in a manner well known in the art of underwater pelletizing.

In the present invention, the circular orifice pattern of the die plate is maintained, and the central portion of the die plate is provided with a electrical resistance heating element. In one embodiment of the present invention, the center of the upstream face of the die plate, adjacent the nose cone, is removed or cut-out to provide a hollow or recessed circular central area inwardly of the nose cone. A circular heating plate is positioned in the recessed central area inwardly of the nose cone and between the nose cone and the die plate for heating the center of the die plate. The flat bottom surface of the circular heating plate is positioned flush with the bottom of the recessed central area to provide full surface contact so that heat from the heating plate flows directly to the die plate.

The die plate is retained in position in a conventional manner by fasteners that connect the extruder, die plate and water box. The nose cone is retained in position by the normally provided nose cone anchor bolt which extends through a circular opening in the center of the circular heating plate. Heater leads or heater wiring extend through a single radial hole in the die plate for attaching to a heater lead connector associated with the circular heating plate for providing power to the plate. The heater wiring can be affixed to the heater lead connector or detachable therefrom. This embodiment of the present invention can be used on one piece die plates, as well as removable center die plates.

In a second embodiment of the present invention, the entire inner diameter of the die plate is cut out to form a centrally located, cylindrical hollow area in the die plate. A cylindrically coiled electric resistance heating element is placed in the hollow inner area. The cylindrically coiled electric resistance heating element is flexible and is designed so that its outer surface is in contact with the inner surface of the die plate hollow inner area so that heat from the heating element flows directly into the die plate. The nose cone is secured by a conventional anchor bolt to close off the upstream side of the hollow inner area; and the other end is closed off by a circular insulation plug of the type disclosed in U.S. Pat. No. 6,824,371, the disclosure of which is expressly incorporated by reference as if fully set forth herein (hereinafter the "'371 patent"), or similar insulation plate, which forms a closure for the hollow downstream end of the die plate.

This second embodiment also utilizes heater leads or heater wiring which extend through a single radial hole in the die plate powering the coiled electric resistance heating element. The heater wiring is preferably formed integrally with the heating element. This embodiment of the present invention can also be used on one piece die plates, as well as removable center die plates.

Positioning the heating elements in direct contact at the center of the die plate provides more effective and more uniform radiation of heat outwardly from the center of the die plate to more effectively elevate the temperature of the die plate and extrusion orifices and more evenly heat all of the extrusion orifices which are arranged in concentric circular patterns about the center of the die plate. The present arrangement which positions the circular or cylindrical heating element in the center of the die plate also avoids elimination of extrusion orifices in certain areas of the die plate which is otherwise required when heating fluid passageways are utilized or when cavities are provided for radially extending cartridge heaters. The center heated die plate is especially beneficial when pelletizing micro pellets which utilize extrusion orifices of very small diameters in which the extruded strands and micro pellets typically have a maximum outside dimension of about 50 microns or less.

It is therefore an object of the present invention to provide a die plate for an underwater pelletizer having an electrical resistance heating element associated in direct heat exchange contact with a central portion of the die plate between the upstream side and the downstream side to provide heat that radiates outwardly from the center of the die plate and evenly to the extrusion orifices which are oriented in concentric circular patterns about the center of the die plate in order for the entire extrusion orifice pattern to be maintained close to an optimum temperature for extrusion of the molten polymer or other extrudate.

Another object of the present invention is to provide a center heated die plate in which the heating element is in the form of a circular electric resistance plate heater positioned in a recessed face in the center of the die plate adjacent the nose cone on upstream side of the die plate.

A further object of the present invention is to provide a center heated die plate in which the electric resistance heating element is in the form of a cylindrical coil positioned internally in a hollow die plate between the upstream and downstream sides with the hollow interior of the die plate being closed by a nose cone at the upstream side and closed by an insulation plug or plate at the downstream side with both the insulation plug and nose cone being held in position by an anchor bolt.

Still another object of the present invention is to provide a center heated die plate for underwater pelletizers in which the central location of the heating element provides effective and even heating of the extrusion orifices and associated areas of the die plate to maintain all of the extrusion orifices and the molten polymer passing therethrough at a constant and even temperature to produce higher quality pellets of a more uniform size.

Yet a further object of the present invention is to provide a center heated die plate in which heater leads or heating wiring connected to the central heating element extend through a single radial hole in the die plate for connection to a power source outside of the die plate.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is an exploded group perspective view of the structure of FIG. 1 illustrating the relationship of the circular heating plate to the die plate and pelletizer components.

FIG. 3 is an exploded group perspective view of a second embodiment of the present invention in the form of a coil type center heated die plate and illustrating the association of the components prior to assembly.

FIG. 4 is a perspective view, partially in section, illustrating the association of the components of the second embodiment of the center heated die plate of the present invention.

FIG. 5 is a partial exploded group perspective view of the second embodiment of the present invention, similar to FIG. 3, but showing the heater wiring formed integrally with the cylindrical coil electric resistance heating element.

DETAILED DESCRIPTION OF THE PREFERRED EMBODIMENTS

Figure 1:
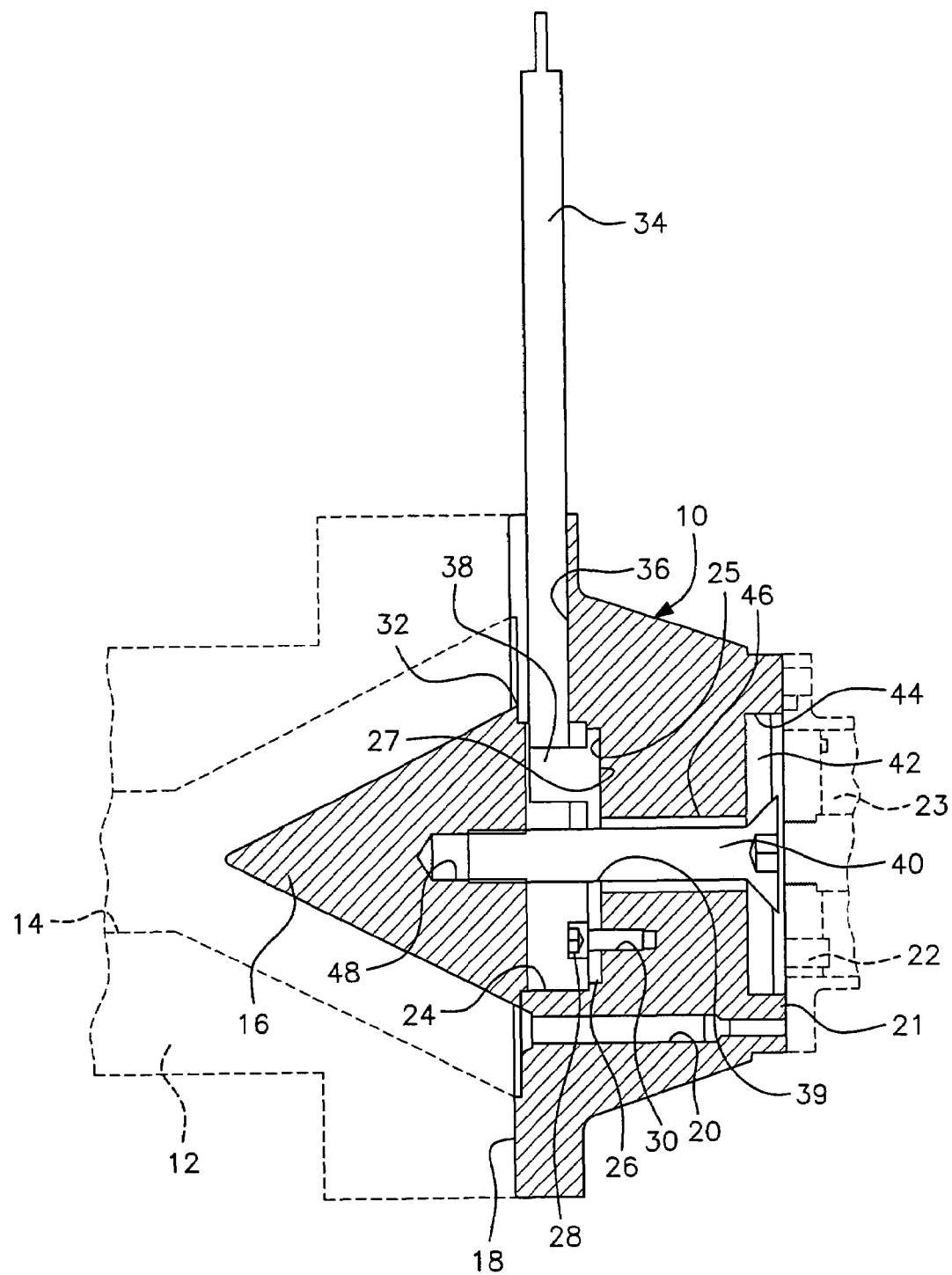
FIG. 1 is a schematic vertical sectional view of one embodiment of the center heated die plate of the present invention in which a circular heating plate is disposed in a recess in the upstream side of the die plate.

Although only preferred embodiments of the invention are explained in detail, it is to be understood that the invention is not limited in its scope to the details of construction and arrangement of components set forth in the following description or illustrated in the drawings. The invention is capable of other embodiments and of being practiced or carried out in various ways. Also, in describing the preferred embodiments, specific terminology will be resorted to for the sake of clarity. It is to be understood that each specific term includes all technical equivalents which operate in a similar manner to accomplish a similar purpose.

Referring to the drawings, FIGS. 1 and 2 illustrate one embodiment of the center heated die plate of the present invention designated generally by reference numeral 10 associated with components of an underwater pelletizer. The underwater pelletizer includes an inlet housing 12 from a molten polymer extruder (not shown). The inlet housing 12 includes a passageway 14 for molten polymer or other extrudate (hereinafter collectively referred to as "polymer") and a nose cone 16 which directs the polymer to the upstream side 18 of the die plate 10. The die plate 10 includes one or more concentric rings of extrusion orifices 20 which extend from the upstream face 18 of the die plate 10 to the downstream face 21 of the die plate 10. A plurality of knife blade assemblies 22 mounted on a rotatably driven cutter hub 23 in a water box (not shown) of the underwater pelletizer cut the extruded cooled and solidified strands of the extruded polymer into pellets which are entrained with the cooling water passing through the water box and discharged as a water and pellet slurry with the pellets subsequently being dried by removing moisture in a dryer.

As illustrated in FIGS. 1 and 2, the upstream face or side 18 of the die plate 10 is cut out to provide an annular recess or cavity 24 inwardly of the extrusion orifices 20. The recess 24 is of circular configuration and receives a circular heating plate 26 which is secured in the bottom of the recess 24 by fasteners 28 threaded into internally threaded bores 30 to anchor the heating plate 26 in the interior of recess or cavity 24. The heating plate 26 includes a lateral connecting member 32 that connects to electrical leads 34 which extend outwardly through a radial hole or passageway 36 for connection to a source of electrical energy. The circular heating plate 26 is designed to fit neatly within recess 24 with the bottom 27 of plate 26 fitting flush against the bottom 25 of the recess 24 to provide full surface contact between surfaces 27 and 25. This full surface contact insures that heat from the circular heating plate 26 flows directly to the die plate surface 25 and thus into the die plate 10.

Once the heating plate 26 has been anchored in place and connected to the electrical leads 34, the nose cone 16 is positioned over the heating plate 26. The electrical leads 34 can be firmly attached to connector 32 or detachably connected thereto. A shallow recess 38 in the base of the nose cone 16 fits within opening 24 of the die face 18 to seal the nose cone 16 against the die face 18.

A nose cone anchor bolt 40 extends through a circular insulation plug 42, such as that disclosed in the '371 patent, that is positioned in a recess 44 on the downstream side of the die plate 10. The anchor bolt 40 extends through a central hole 46 in the die plate and a central hole 39 in the heating plate 26 and is screw threaded into a threaded bore 48 in the base of the nose cone 16. FIG. 1 illustrates the assembled condition of the components of the center heated die plate 10. The circular insulation plug 42 and anchor bolt 40 form a closure for the central bore 46. Molten polymer can then be extruded through the extrusion orifices 20 with the heat plate 26 maintaining an elevated temperature of the die plate by radiating heat outwardly from the recess or cavity 24 at points intermediate the upstream die face 18 and the downstream die face 21. The insulation plate 42 forms a closure for the downstream side of the die plate and the nose cone 16 forms a closure for the upstream side of the die plate so that the heat produced by the heat plate 26 is conducted to the die plate between the upstream and downstream faces or sides of the die plate.

The heating plate 26 of the present invention is preferably a conventional plate heater, such as commercially available from Watlow Electric Manufacturing Company, St. Louis, Mo., Model HT Foil Heater.

FIGS. 3, 4 and 5 illustrate a second embodiment of the present invention in which the die plate, generally designated by reference numeral 60, includes a cylindrical hollow interior 62 extending from an upstream side or face 64 to a downstream side or face 66. The die plate 60 includes extrusion orifices 68 extending from the upstream side 64 to the downstream side 66 and arranged in a circular pattern of one or more circles. A heating device 70 in the form a of a cylindrical coil is positioned in the cylindrical interior 62 of the die plate 60 and includes a connector 72 adjacent the nose cone 74. The nose cone 74 is secured in place with its base inwardly of the circular pattern of the extrusion orifices 68. The connector 72 is connected to electrical leads 76 which extend out through a radial hole or passageway 78 for connection to a source of electrical energy.

The heating coil 70 is disposed interiorly of the cylindrical interior 62 in direct heat exchange contact with the surface 63 of the cylindrical interior 62. The heating coil 70 is flexible so that it can be twisted with its outer diameter reduced so as to fit within the cylindrical interior 62. When released, the diameter expands so that the outer surface of the coil 70 seats in direct contact with the surface 63 of the cylindrical interior 62. Thus, heat from the heating coil 70 passes directly into the die plate 10 through the surface 63. The downstream end 75 of the coil 70 rests against a shoulder 80 in the inner end of the cylindrical interior 62. An insulation plug or closure plate 82 is inserted into the downstream side 66 of the die plate and includes a sealing edge 84 which engages surface 86 of shoulder 80 on the die plate. A nose cone anchor bolt 88 extends through the plate 82, heating coil 70 and threads into the nose cone 74 to maintain the structure in assembled relation as illustrated in FIG. 4.

In the form of the second embodiment shown in FIG. 5, the electrical leads or heater wiring 76' which extend out through the radial hole or passageway 78' are formed integrally with the upstream end of the cylindrical coil heating device 70'. This integral structure reduces the cost and improves the quality of the cylindrical coil heater assembly.

The heating coil 70 and 70' of the present invention is preferably a conventional coil heater, such as commercially available from Gebhard & Castiglia GmbH & Co., Waldbroel, Germany, Model GC Coil, which includes integral electrical leads 76'.

The foregoing should be considered as illustrative only of the principles of the invention. Since numerous modifications and changes will readily occur to those skilled in the art, it is not desired to limit the invention to the exact construction and operation shown and described. Accordingly, all suitable modifications and equivalents may be resorted to, falling within the scope of the invention.

What is claimed is:

1. A die plate and heating assembly for a pelletizer, comprising an extrusion die plate having an inner wall that defines a hollow cylindrical center that extends all the way through the die plate from an upstream face to a downstream face thereof, said die plate including a plurality of orifices surrounding and separate from said hollow center through which molten polymer flows from said upstream face to said downstream face and is extruded to exit at said downstream face as a strand cut into pellets by a moving cutting assembly, and a generally cylindrical coil heating element positioned in said hollow center of said die plate in heat exchange relation to said die plate inner wall to retain said inner wall and the extrusion orifices located adjacent and exterior to said inner wall at an elevated temperature and maintain the polymer passing through the orifices in a molten state as the polymer passes through the orifices.

2. The assembly as claimed in claim 1, wherein said hollow center of the die plate is closed at one end by a nose cone and closed at an other end by an insulation plug to retain heat in the center of the die plate for radiation outwardly toward said orifices.

3. The assembly as claimed in claim 1, wherein said heating element is connected to heating leads which extend through a single radial passageway in said die plate for supplying electrical power to said heating element.

4. A die plate for extruding polymer strands in an underwater pelletizer which comprises a plurality of extrusion orifices oriented in a circular pattern around a periphery of the die plate and extending from an upstream face of the die plate to a downstream face of the die plate, said die plate having an inner wall that defines a hollow cylindrical area also extending from said upstream face to said downstream face to pass all the way through said die plate, said hollow area being substantially centrally located in said die plate and separated from said orifices by said inner wall, said hollow cylindrical area being configured to receive a generally cylindrical coil heating element positioned in heat exchange relation to said inner wall of said die plate which is located inwardly of the circular pattern of said extrusion orifices to radiate heat outwardly to said extrusion orifices through said inner wall to maintain the polymer in a molten state during passage through said orifices.

5. The die plate claimed in claim 4, wherein said heating element is an electric resistance heating element having power supplied thereto by heating leads which connect to said heating element and extend through a single passageway in said die plate to a power source outside said die plate.

6. The die plate as claimed in claim 4, further comprising a nose cone forming a closure for said hollow cylindrical area at the upstream face of the die plate and a closure plate forming a closure for said hollow cylindrical area at the downstream face of the die plate.

7. The die plate as claimed in claim 5, wherein said heating leads are formed integrally with an end of said cylindrical coil.

8. A die plate and heater assembly for extruding polymer strands in an underwater pelletizer which comprises an extrusion die plate having a plurality of extrusion orifices oriented in a circular pattern around a periphery of the die plate and extending from an upstream face of the die plate to a downstream face of the die plate, said die plate having a hollow cylindrical area located radially inwardly of and separate from said extrusion orifices and also extending all the way through said die plate from said upstream face to said downstream face, and a cylindrical coil heater positioned in said hollow cylindrical area in said die plate.

9. The assembly as claimed in claim 8, wherein said coil heater is retained in said hollow cylindrical area by a nose cone forming a closure at said upstream face and an insulation plug forming a closure at said downstream face.

10. The assembly as claimed in claim 9, wherein said nose cone and said insulation plug are held in place by a nose cone anchor bolt which passes through a central hole in said insulation plug and said coil heater and threads into said nose cone.

11. The assembly as claimed in claim 8, further comprising heating leads connected to said coil heater and extending through a single passageway in said die plate for providing power to said coil heater, said heating leads providing the only source for power to said coil heater.

12. The assembly as claimed in claim 8, further comprising heating leads connected to said coil heater and extending through a single passageway in said die plate for providing power to said coil heater, said heating leads being formed integrally with an end of said cylindrical coil heater.

13. The assembly as claimed in claim 8, further comprising heating leads connected to said coil heater and extending through a single passageway in said die plate for providing power to said coil heater, said single passageway extending radially in said die plate.

14. The heating assembly as claimed in claim 1, wherein a portion of said heating element is in full surface contact with said die plate inner wall so that heat from said heating element flows directly to said die plate.

15. The assembly as claimed in claim 8, wherein an outer surface of said cylindrical coil heater is in contact with an inner wall of said die plate that defines said hollow cylindrical area so that heat from said coil heater flows directly to said die plate inner wall.

16. The assembly claimed in claim 1, wherein said heating element is an electric resistance heating element.

17. The assembly as claimed in claim 1, wherein said generally cylindrical coil heating element is in direct abutment with said die plate inner wall under spring tension and surrounds a remaining portion of said hollow area that remains hollow.

18. The assembly as claimed in claim 8, wherein said generally cylindrical coil heating element is in direct abutment under spring tension with an inner wall of said die plate that defines a perimeter of said hollow cylindrical area, a remaining area of said hollow cylindrical area remaining hollow when said coil heating element is in place.

19. The assembly as claimed in claim 1, wherein said hollow center includes an area including a centermost area of said die plate.

20. The assembly as claimed in claim 1, wherein said coil heating element is flexible to enable an outer diameter thereof to be reduced by twisting for insertion of the element into the hollow center, said outer diameter expanding when said coil heating element is released such that an outer surface of said coil heating element seats in direct contact with said die plate inner wall when assembled.

21. The assembly as claimed in claim 15, wherein said coil heater is a flexible element having an outer diameter that is reduced by twisting for insertion of the element into the hollow area, said outer diameter expanding when said element is released so that an outer surface of said heater element seats in direct contact with die plate inner wall when assembled.

* * * * *